United States Patent
Andreasen

(10) Patent No.: US 7,620,708 B2
(45) Date of Patent: Nov. 17, 2009

(54) AUTOMATIC DISCOVERY OF CONTROLLING POLICY ENFORCEMENT POINT IN A POLICY PUSH MODEL

(75) Inventor: Flemming S. Andreasen, Marlboro, NJ (US)

(73) Assignee: Cisco Technology, Inc., San Jose, CA (US)

(*) Notice: Subject to any disclaimer, the term of this patent is extended or adjusted under 35 U.S.C. 154(b) by 820 days.

(21) Appl. No.: 11/142,031

(22) Filed: May 31, 2005

(65) Prior Publication Data

US 2006/0272003 A1    Nov. 30, 2006

(51) Int. Cl.
*H04L 12/16* (2006.01)
*G06F 17/00* (2006.01)

(52) U.S. Cl. .................. 709/223; 709/220; 709/225; 726/1

(58) Field of Classification Search ............. 726/1; 709/223–226

See application file for complete search history.

(56) References Cited

U.S. PATENT DOCUMENTS 6,621,793 B2 * 9/2003 Widegren et al. ......... 370/230.1
7,106,756 B1 * 9/2006 Donovan et al. ............. 370/468

OTHER PUBLICATIONS

Phanse, et al., "Protocol support for policy-based management of mobile ad hoc networks," Network Operations and Management Symposium, 2004. NOMS 2004. IEEE/IFIP, vol. 1, No., pp. 3-16 vol. 1, 23-23 Apr. 2004.*

Durham, D., et al., "The COPS (Common Open Policy Service) Protocol", RFC 2748, Jan. 2000.*
Chan, K., et al., "COPS Usage for Policy Provisioning (COPS-PR)", RFC 3084, Mar. 2001.*
Johnson, D., et al. "The Dynamic Source Routing Protocol for Mobile Ad Hoc Networks (DSR)." Apr. 15, 2003. Available at http://tools.ietf.org/id/draft-ietf-manet-dsr-09.txt. Downloaded Mar. 19, 2009.*
Baker, F., et al. "Cisco Architecture for Lawful Intercept in IP Networks," RFC 3924. Oct. 2004. Available at http://tools.ietf.org/rfc/rfc3924.txt. Downloaded Mar. 20, 2009.*
Warnicke, E., "A Suggested Scheme for DNS Resolution of Networks and Gateways draft-warnicke-network-dns-resolution-04," DNS Extensions Working Group, Internet-Draft, pp. 1-17, Mar. 2004.

* cited by examiner

Primary Examiner—Nasser G Moazzami
Assistant Examiner—Travis Pogmore
(74) Attorney, Agent, or Firm—Brinks Hofer Gilson & Lione

(57) ABSTRACT

The present invention provides a method for performing automatic discovery of controlling policy enforcement points in a policy push computer network. The method involves a policy decision point sending a discover message toward an end point on a computer network; receiving a response from a policy enforcement point; reading a name and address from the received response; and sending a policy decision message to the name and address read from the response. The policy decision message is characterized by content suitable for being installed for a policy enforcement point. In an embodiment, the discover message sent includes a resource reservation protocol and a new policy enforcement point discover object. In another embodiment, the discover message sent causes the policy enforcement point to process the discover message. The policy decision point can receive notification that installation of the policy decision for the policy enforcement point failed.

14 Claims, 2 Drawing Sheets

AUTOMATIC DISCOVERY OF CONTROLLING POLICY ENFORCEMENT POINT IN A POLICY PUSH MODEL

FIELD

The present invention relates broadly to computer networks and policy updates promulgated throughout the network.

BACKGROUND

Policy-based networking is the management of a network so that various kinds of traffic—data, voice, and video—get the priority of availability and bandwidth needed to serve the network's users effectively. With the convergence of data, telephone, and video traffic in the same network, companies will be challenged to manage traffic so that one kind of service doesn't preempt another kind. Using policy statements, network administrators can specify which kinds of service to give priority at what times of day on what parts of their Internet protocol (IP)-based network. This kind of management is often known as Quality of Service (QoS) and is controlled using policy-based network software. Theoretically, a policy statement could be as natural as: "Provide the fastest forwarding for all voice traffic to Chicago between 9 am and 3 pm."

In actuality, most policy-based networking software today requires a much more detailed and network-aware statement. Currently, the Internet Engineering Task Force (IETF) is working on a standard policy framework and related protocols. A typical policy-based network includes a network management console at which policies are entered, edited, or called from a policy repository. Also included is a server, referred to as the policy decision point (PDP), that retrieves policies from the policy repository and acts on the policies on behalf of policy enforcement points (PEPs). PEPs are typically the router, switches, and other network devices that enforce the policies, using an access control list, queue management algorithms, or the like. A policy repository is also often used, which is a directory server of policies that is based on the lightweight directory access protocol (LDAP).

QoS requests arriving at a PEP are authorized by a PDP using either a pull or a push model. In the push model, the PDP pushes a policy decision to the PEP before the QoS request arrives. Usually, there is more than one PEP in the network and hence the PDP needs to determine to which PEP a given policy request needs to be sent. Today, this determination is performed through manual provisioning, for example by assigning variably-sized IP subnets to individual PEPs and storing this information in a domain name server (DNS). However, this provisioned topology awareness is time-consuming, error prone, and works poorly when the topology changes, such as in cases of network renumbering or subnet relocation from one PEP to another.

The above describes policy-based networking in terms of QoS, however policy-based networking and the need for a PDP to discover a PEP applies more broadly. For example, installation of a content tap in a switch or router, or dynamic control of Network Address Translator (NAT) or Firewall pinholes for a particular session can be viewed as policy-based networking as well. The present invention described herein applies equally well to all of these.

SUMMARY

The present invention provides a method for performing automatic discovery of controlling policy enforcement points in a policy push computer network. The method involves a policy decision point sending a discover message toward an end point on a computer network; receiving a response from a policy enforcement point; reading a name and address from the received response; and sending a policy decision message to the name and address read from the response. The policy decision message is characterized by content suitable for being installed for a policy enforcement point. In an embodiment, the discover message sent includes a resource reservation protocol and a new policy enforcement point discover object. In another embodiment, the discover message sent causes the policy enforcement point to process the discover message. The policy decision point can receive notification that installation of the policy decision on the policy enforcement point failed.

DETAILED DESCRIPTION

Figure 1:
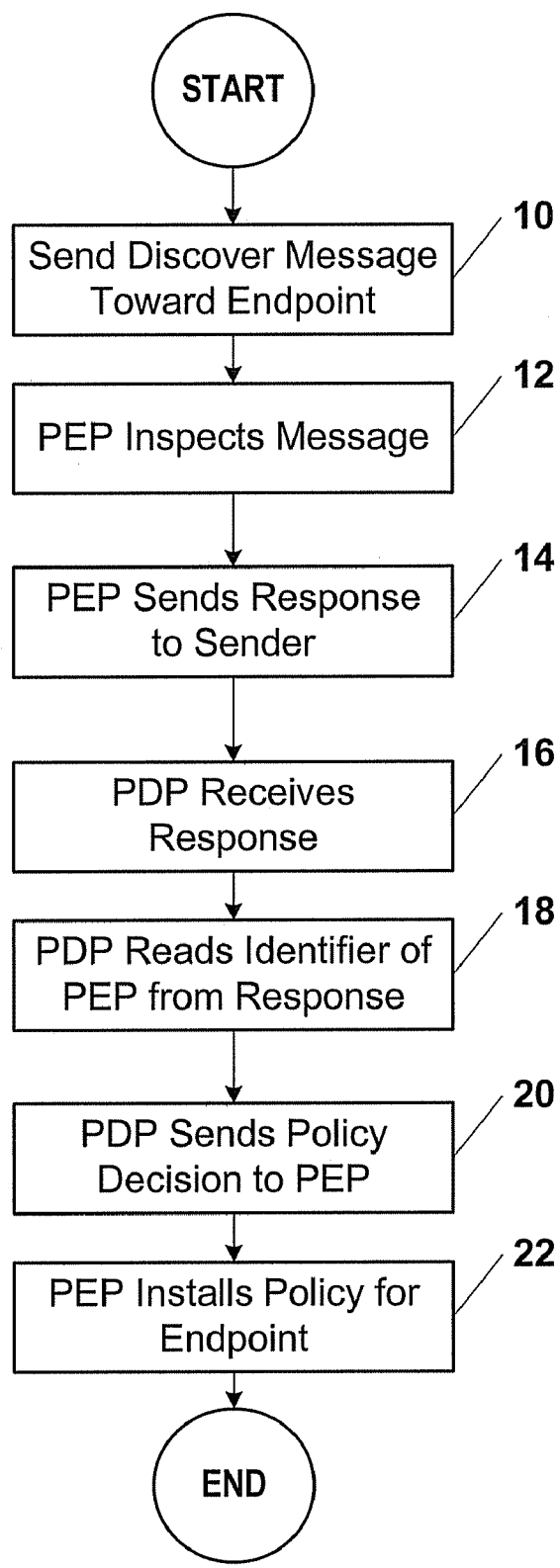
FIG. 1 illustrates a sequence of acts executed in accordance with a method of the present invention.

In an embodiment, the present invention uses path-coupled signaling to automatically discover the correct PEP for a given request, allowing the PDP and PEP to be more loosely coupled than previous applications and also requiring less effort to provision. A PDP that wants to push a policy decision for a given endpoint to a PEP will initially not know which PEP in the network the endpoint is served by. It can be assumed that the endpoint is not multi-homed because if it was, it would be difficult or impossible to determine which PEP the endpoint's traffic ends up traversing, and hence IP datagrams sent to the endpoint would traverse the same PEP as IP datagrams sent from the endpoint. Directing attention to FIG. 1, the present invention sends a PEP discover message with a destination address of the endpoint in question (act 10). The PEP discover message sent can use a wide variety of high-level protocols, but is inspected by the PEP (act 12). There are several ways this can be done. In one embodiment, the use of resource reservation protocol (RSVP) with a new PEP discover object is used. In another embodiment, a higher layer protocol combined with the router alert bit to cause the PEP to process the message. As the PEP discover message traverses a PEP, the PEP generates and sends a response (act 14) to the PDP that sent the PEP discover message to inform it of the name and/or address of the PEP. This response is delivered reliably to the PDP. Once the PDP receives the response (act 16), it reads the name and/or address of the PEP for the endpoint in question (act 18) and can send the policy decision to it (act 20). The next time the PDP needs to install a policy decision for that endpoint, it sends a message to the PEP discovered previously (act 22). If the policy install fails, for example because the PEP no longer serves the endpoint, the PEP has failed and another takes over, etc., the PDP repeats the discovery process described above to determine the current PEP for the endpoint.

When a PEP receives a PEP discover message, it should respond to it and forward it toward the endpoint. There are two reasons for this: first, there may be more than one PEP on the path to the endpoint. Second, the actual protocol being used to carry the PEP discover message may itself require such forwarding (such as in the case of RSVP).

The present invention provides the advantages of avoiding administrative overhead and potential errors of provisioning information to map endpoints to certain PDPs. Furthermore, solutions based on provisioning perform poorly and are error-prone as the information provisioned needs to be changed. For example, when networks are renumbered, PEPs such as CMTS are being split, or endpoints are moved from one PEP to another, the old provisioned information no longer applies and needs to be updated. This is both error-prone and operationally challenging. The dynamic discovery mechanism of the present invention avoids all of these problems and instead automates the process, which results in more robust networks that are easier to manage.

The PDP is not necessarily placed along the path between endpoints. Thus, the route between endpoints can be different from the route between the PDP and one of the endpoints. Typically, the only PEPs that can be discovered are the ones in the common route. In typical applications, PEPs are not always located only in the edge router. In an embodiment, the acts illustrated in FIG. 1 are embodied in a computer-readable medium containing instructions that can be executed by a computer. In another embodiment, the acts illustrated in FIG. 1 are embodied in hardware contained on an integrated circuit board contained in a computer.

The present invention has particularly useful application in cable modem termination systems (CMTSs) and Call Agent products using the PACKETCABLE™, a trademark from Cable Television Laboratories, Inc. in Delaware, DqoS (Dynamic Quality-of-Service Specification) protocol, which is set of protocols developed to deliver Quality of Service enhanced communications services using packetized data transmission technology to a consumer's home over the cable network, for policy push. The present invention is also useful for CMTSs and policy servers using the PACKETCABLE™ Multimedia specification, which describes a service delivery framework that provides general-purpose Quality of Service, event-based accounting, and security functionality, that suffers similar problems described above.

PEP Discovery and Lawful Intercept

Figure 2:
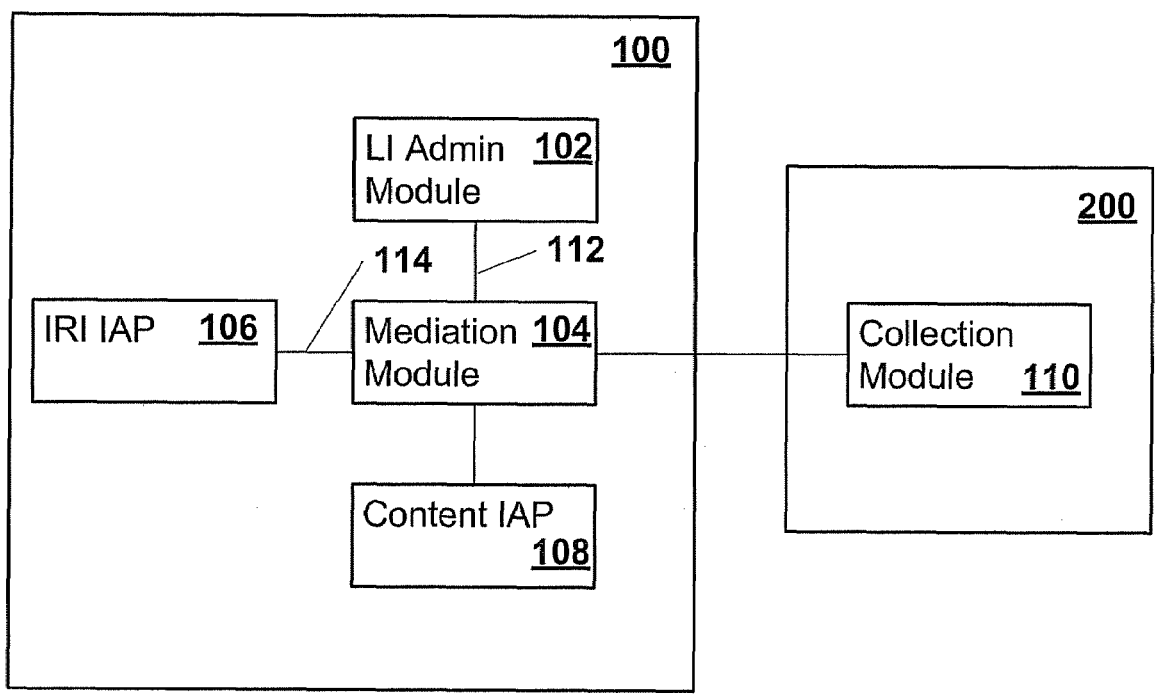
FIG. 2 illustrates in block diagram form modules that utilize the methods of the present invention.

FIG. 2 shows a functional view of a generic Lawful Intercept architecture, one application that utilizes the methods of the present invention. LI administration module 102 provides the interface to the other components in terms of what needs to be provisioned by service provider 100 when a lawful intercept is requested. Intercept access point for (intercept-related) Identification Information (IRI IAP 106) is a module that provides intercept-related information to mediation module 104 (e.g. when a session was initiated, when it was released etc.). Also included is addressing information for any data that needs to be tapped (e.g. IP address and port for a UDP media stream). Content intercept access point 108 is typically an edge router or switch that can be used for tapping the media stream. Mediation module receives the data from IAP 108, packages it into the required format (which may vary from country to country) and delivers it to the law enforcement agency system 200. System 200 incorporates collection module 110 for collecting and presenting the tapped data to the system 200. In the architecture illustrated in FIG. 2, interface 112 is a communication medium used to request the tap. This results in provisioning the IRI IAP over interface 114. The IRI IAP then passes IRI over interface 114. Included in that IRI is session address information for the data/media stream to be tapped. This is typically the IP address (and port) of the end user equipment that is generating and/or receiving the media stream. Given that address information, mediation module 104 needs to find the IP address of an edge router, switch or some other device that it can use to request tapping the data/media stream, and the method illustrated in FIG. 1 is utilized for this function. In this application, LI administration module 102 must be undetectable by the intercept subject. This requirement implies that the tap must take place on equipment that is accessible to the provider but inaccessible to the intercept target (user). It must also be performed along the normal path of the data. Other approaches, such as modifying the path of the user's data, are potentially detectable (using Traceroute etc.). In many cases, the best location for tapping the call is at the edge router just inside the provider's network. In some cases tapping may also be required when a call is going to some equipment that is acting as a proxy for the user (e.g. the user's voice-mail system). In that case, a convenient place to put the tap is on the aggregation router or switch in front of that equipment.

For many of these deployments, tapping can be performed on the specific edge router or switch that is close to the user's equipment (or the equipment acting as the user's proxy), such as content IAP 108. In order to utilize the present invention and meet the detectability requirement (the user cannot detect that tapping is occurring), any messages related to lawful intercept must not reach the user. Using the method of the present invention, mediation module 104 (wanting to discover the PEP/Content IAP 108) sends a control point discovery message towards the user's equipment. Content IAP 108 detects the request and responds back to mediation module 104 with the IP address required to tap the data/media without forwarding it on.

While a method and apparatus for performing automatic discovery of controlling policy enforcement points in a policy push model has been described and illustrated in detail, many modifications can be made to various embodiments of the present invention without departing from the spirit thereof.

What is claimed is:

1. A method comprising:
    discovering, by a policy decision point, a policy enforcement point on a path between the policy decision point and an identified endpoint in a network, wherein discovering the policy enforcement point includes:
        sending, by the policy decision point, a discover message toward the identified endpoint over the network, wherein sending the discover message includes addressing the discover message to an address of the identified endpoint and forwarding the discover message at each of a plurality of hops between the policy decision point and the policy enforcement point without regard to the number of the hops from the policy decision point;
        receiving a response to the discover message from the policy enforcement point; and
        reading an identifier of the policy enforcement point from the received response; and
    sending, by the policy decision point, a policy decision for the identified endpoint to the policy enforcement point.

2. The method of claim 1, further comprising sending the discover message using a resource reservation protocol.

3. The method of claim 1 further comprising receiving, at the policy decision point, a notification of a failure of the policy decision to install on the policy enforcement point and, in response to receiving the notification of the failure, sending a new discover message to the identified endpoint to discover a new policy enforcement point on the path from the policy decision point to the identified endpoint.

4. The method of claim 1, further comprising the policy enforcement point sending the response to the discover message without forwarding the discover message to the identified endpoint in response to determining the policy enforcement point is an edge router of a provider network serving the identified endpoint.

5. The method of claim 4, further comprising tapping a media stream passing through the policy enforcement point.

6. A method comprising:
discovering a plurality of policy enforcement points on a path between a policy decision point and an identified endpoint in a policy push network, wherein discovering the policy enforcement points includes:
receiving from the policy decision point a discover message having a destination address of the identified endpoint on the policy push network;
sending a response to the policy decision point, the response including an identifier of a policy enforcement point, the policy enforcement points including the policy enforcement point; and
forwarding the discover message toward the identified endpoint regardless of the number of the hops from the policy decision point;
receiving from the policy decision point a policy decision for the identified endpoint; and
attempting to install the policy decision on the policy enforcement point.

7. The method of claim 6, wherein the discover message is received using a resource reservation protocol.

8. The method of claim 6, further comprising notifying the policy decision point that installation of the policy decision for the identified endpoint failed.

9. The method of claim 8, wherein notifying the policy decision point that installation of the policy decision for the identified endpoint failed is in response to determining the policy enforcement point fails to serve the endpoint.

10. The method of claim 6, wherein the policy decision relates to a Quality of Service (QoS) request.

11. A tangible computer readable medium including computer executable instructions, the computer executable instructions executable by a processor, the tangible computer readable medium comprising:

instructions executable to send a discover message from a policy decision point toward an identified endpoint over a network for discovery of a policy enforcement point on a path between the policy decision point and the identified endpoint, regardless of how many hops on the path the policy enforcement point is from the policy decision point;
instructions executable to receive a response to the discover message from the policy enforcement point;
instructions executable to read an identifier of the policy enforcement point from the received response; and
instructions executable to send a policy decision for the identified endpoint to the policy enforcement point.

12. An apparatus comprising:
a memory;
a processor in communication with the memory, the memory including computer code executable with the processor, wherein the computer code is configured to:
discover a policy enforcement point on a path between a policy decision point and an identified endpoint in a network, wherein the computer code configured to discover the policy enforcement point is configured to:
forward a discover message toward the identified endpoint at each of a plurality of hops between the policy decision point and the policy enforcement point without regard to the number of the hops from the policy decision point, wherein the discover message is addressed to the identified endpoint;
receive a response to the discover message from the policy enforcement point; and
read an identifier of the policy enforcement point from the received response.

13. The apparatus of claim 12, wherein the discover message is a resource reservation protocol message.

14. The apparatus of claim 12, wherein the computer code configured to forward the discover message is further configured to unicast the discover message.

* * * * *

UNITED STATES PATENT AND TRADEMARK OFFICE
CERTIFICATE OF CORRECTION

PATENT NO. : 7,620,708 B2  Page 1 of 1
APPLICATION NO. : 11/142031
DATED : November 17, 2009
INVENTOR(S) : Flemming S. Andreasen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1024 days.

Signed and Sealed this

Fourteenth Day of December, 2010

David J. Kappos
*Director of the United States Patent and Trademark Office*